Jan. 22, 1957

R. P. MORK 2,778,232

PRECISION CARRIAGE DISPLACEMENT DEVICE

Filed Sept. 24, 1952

INVENTOR.
RAYMOND P. MORK
BY
Campbell, Brumbaugh, Free &
Graves
ATTORNEYS

United States Patent Office 2,778,232
Patented Jan. 22, 1957

2,778,232

PRECISION CARRIAGE DISPLACEMENT DEVICE

Raymond P. Mork, Needham, Mass., assignor to Time, Incorporated, New York, N. Y., a corporation of New York Application September 24, 1952, Serial No. 311,269

13 Claims. (Cl. 74—125.5)

This invention relates to a precision carriage displacement device adapted to be mounted on any type of machine having a carriage which moves on a stationary bed.

For example, in a system for making computed separation negatives from color transparencies, a film mounted for scanning on a rotatable drum must be advanced, upon each revolution of the drum, by an increment equal to the width of the scanning beam. These increments of advance are very small and may be carried out at a rate of 250 or 500 or more lines to the inch. This requires that the carriage supporting the rotatable drum be advanced every two seconds a distance of 0.002 inch with a precision of about 10 microinches.

Devices for advancing a scanning drum axially upon each revolution of the drum are known. One such mechanism utilizes the thread of an accurately machined screw to advance the scanning drum at a constant rate in order that the drum will be advanced the required distance during each revolution thereof. This mechanism has several serious and inherent disadvantages, among which is the fact that it is difficult to machine a screw thread with sufficient accuracy to avoid the formation of objectionable lines in the image or images reproduced by the scanning operation. An additional disadvantage is that the rate of advance per revolution of the drum is not adjustable.

Using the device of the present invention, the scanning drum can be advanced axially through predetermined successive incremental distances upon each revolution thereof with extreme accuracy by a device which is attached to the underside of the bed of the machine and projects through a slot in the bed between the ways. The device includes a lever moved reciprocally between two stops by a motor driven eccentric, a flat bar displaced a small amount by the lever, and a magnetic gripper to connect the bar to the machine carriage in order to move the carriage when the bar is displaced.

It is an object of this invention to provide a mechanism for moving a scanning drum axially from one scanning position to the next after one line has been scanned and before the scanning of the next line begins, thus permitting straight rather than helical scanning.

It is a further object of this invention to provide a mechanism for moving a scanning drum axially from one scanning position to the next in which the increments of advance are controllable with extreme accuracy.

Figure 1:
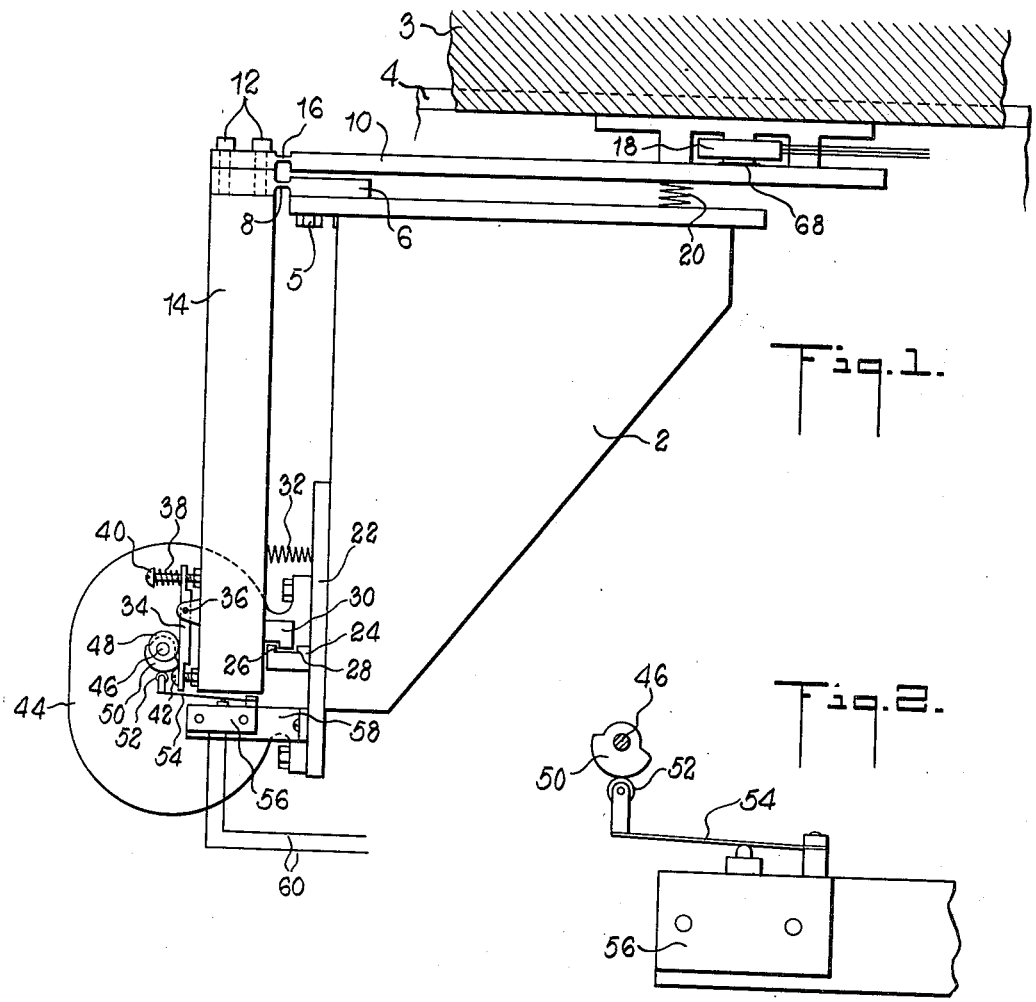
Figure 2:
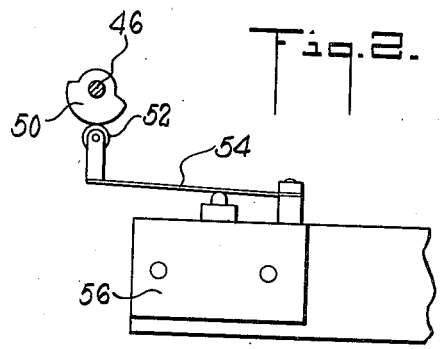
Figure 3:
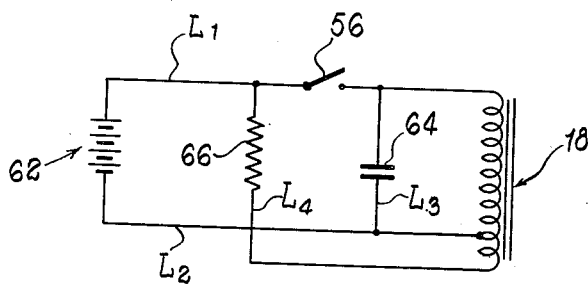

The invention will be further illustrated by reference to the accompanying drawings in which, Figure 1 is a view in elevation of the device of the invention mounted on a machine having a movable carriage;

Figure 2 is an enlarged view of the switch which operates the magnetic gripper; and Figure 3 is a schematic view of the electrical circuit employed in the device.

Referring to Figure 1, a bracket 2 is shown which may be welded, bolted or otherwise secured to the underside of the bed of a machine having a movable carriage 3 thereon supported by ways 4. The bracket 2 may be considered to be a stationary base. Bolted to the top of bracket 2 by a bolt 5 is a fulcrum block 6 having a reduced section 8 therein to afford a region of relatively great flexibility and thus a pivot point in which no play or lost motion exists. A rigid bar 10 and a lever 14 are bolted to the fulcrum block 6 by the bolts 12 which extend through the bar 10 and block 6 and are threaded into drilled and tapped holes in the top of the lever 14. The lever 14 is thus joined to the bar 10 to form therewith an angled frame which structurally is self-sustaining as to the relative positions of its component elements 10, 14. The rigid bar 10 has a reduced section 16 therein which, in the disclosed embodiment, is positioned directly above the reduced section 8 in the fulcrum block 6 and permits the bar 10 to remain substantially level as the lever 14 pivots. The bar 10 has formed on its upper side a smooth gripping surface 11 extending lengthwise on the bar for a distance at least as great as the distance the carriage 3 is to travel.

An electromagnet 18 is secured to the bottom of the carriage 3. The yoke 19 of the electromagnet has formed on its underside a gripping surface 21 which matches with the upper gripping surface 11 of the bar 10 and contacts the upper surface of the bar 10, the latter being held lightly in engagement therewith at all times by the compression spring 20.

A bracket 22 is secured to the left-hand side of the bracket 2, as viewed in Figure 1, having a two-position stop block 24 mounted thereon. Stop block 24 has stops 26 and 28 thereon which engage with a stop block 30 mounted on the lever 14 when the lever is displaced to the right or left, as viewed in Figure 1. A compression spring 32 disposed between bracket 22 and lever 14 urges the lower end of the lever 14 to the left.

A rock bar 34 is mounted on the left-hand side of the lever 14, as viewed in Figure 1, being pivoted thereon at 36, and continually biased in a clockwise direction by a compression spring 38 carried by a bolt 40 that is mounted on the lever 14. In order that the rock bar 34 may be maintained substantially parallel to the lever 14, the lower end of the rock bar is drilled to receive the shank of a stop screw 42.

A motor 44 is secured to the bracket 22 and drives a shaft 46 having an eccentric 48 mounted thereon for engaging the rock bar 34. Also mounted on the shaft 46 is a cam 50 which is shown in engagement with a roller 52 on a switch actuating arm 54 of a switch 56. The switch 56 is supported on a switch mounting bracket 58 secured to the bracket 22 and is electrically connected to the electromagnet 18 by the wires 60.

Referring to Figure 3, the electrical operating circuit for the device is shown. A source of power 62 is connected to the cam-operated switch 56 and the magnetic gripper 18 by wires $L_1$ and $L_2$. A spark suppressing condenser 64 is connected across the electromagnet 18 by wire $L_3$ and a resistor 66 is connected between the wire $L_1$ and the remote end of the electromagnet 18 by a wire $L_4$ so that a small current continually flows through the electromagnet 18 in opposition to the main current from wires $L_1$ and $L_2$. The reverse current flowing through wire $L_4$ and the resistor 66 effectively demagnetizes the magnetic gripper 18 when the circuit is broken by opening the switch 56.

The operation of the device is as follows. Initially, when the electromagnet 18 is deenergized, the frictional drag between the magnet 18 and the bar 10 is very low. The lower end of lever 14 is held in the extreme left position by the compression spring 32, with stop block 30 abutting face 26 on stop block 24. The eccentric 48 is turned so that its low side faces the rock bar 34 and is free of contact therewith.

As the motor rotates the shaft 46, the cam 50 closes the switch 56 thus energizing the magnet 18. By properly designing the electrical circuit and components thereof, a magnetic pull of several hundred pounds on the bar 10 can easily be achieved, thus resulting in an available driving force for the carriage of approximately 50 pounds. Since the force required to move the carriage 3 is never more than 15 pounds, the carriage is in effect locked to the bar 10 when the magnet 18 is energized. As the eccentric rotates further, it engages the rock bar 34 and moves the lower end of the lever 14 to the right until the stop block 30 abuts face 28 on the stationary stop block 24. During this motion, the rock bar 34 and lever 14 move as a unit, since the compression spring 38 exerts sufficient force to hold the rock bar against the head of the stop screw 42.

As the lower end of the lever 14 moves to the right, it pivots about the reduced section 8 of the fulcrum block and the bar 10 moves to the left an amount equivalent to the movement of the lower end of the lever 14 divided by the lever ratio, thus moving the carriage 3 a corresponding distance. The lever ratio is not critical and a ratio of approximately 20 to 1 has been found to give excellent results, but accuracy is increased by the use of higher ratios.

The eccentric 48 continues to turn after the counterclockwise movement of the lever 14 is arrested by the stop blocks 30 and 24 and the rock bar 34 rocks away from the stop screw 42 in order to permit the eccentric 48 to rotate without binding.

When the lever 14 has completed its counterclockwise movement and the carriage 3 is at rest, the switch 56 opens, due to the continued rotation of the cam 50, and the magnet 18 is deenergized, thereby releasing the carriage. The lower end of the lever 14 under the urging of spring 32 then moves to the left until its clockwise motion is again arrested by the stop blocks 30 and 24 and the pull bar 10 moves to the right in preparation for the succeeding stroke.

In order to reduce the residual magnetism of the electromagnet 18 substantially to zero, a thin non-magnetic shim 68 is used between the magnet 18 and pull bar 10 in addition to the small reverse current flowing through the magnet coil.

From the foregoing, it will be seen that the device of the invention is extremely stiff and insensitve to variations in load. The calculated and measured stiffness is 800,000 pounds per inch. To achieve maximum stiffness, short heavy sections should be used in so far as is possible, particularly when bending moments are present. An equally important feature contributing to high stiffness is the use of bending sections for pivots rather than the usual pins, thereby eliminating backlash, oil films, and questionable areas of contact. The errors unavoidably produced are, of course, reduced by the lever ratio.

At all times in the cycle, the pull bar 10 is held rigidly to prevent undesired longitudinal movement. Hence, it cannot be moved longitudinally by the forces applied to it as the magnet grips it. Were it not for this feature, such factors as a slight unevenness of the pull bar surface or a minor misalignment of the magnet could cause longitudinal motion on the pull bar as it was being gripped, with resultant errors in stroke length. The length of the stroke is determined by the space between two stops which is easily controlled to a high degree of precision so that precise operation of the device of the invention does not depend upon close tolerances and fits or precision machining. The eccentricity of the cam and the position of its shaft in its bearings have no effect on the stroke length. The gripping and releasing of the pull bar occur only when the carriage is at rest and, therefore, the time of gripping and releasing can have no effect on stroke length.

The device of the invention is capable of being applied to a variety of machines in addition to those previously described. For example, it could be applied to the precision positioning of the carriages of automatic machine tools, to ruling diffraction gratings or to ruling precision engraved scales for measurng instruments, optical range finders and the like.

It will be appreciated by those skilled in the art that many modifications may be made within the scope of the present invention without departing from the spirit thereof, and the invention is to be restricted only in accordance with the appended claims.

I claim:

1. A precision carriage displacement device adapted for use on a machine having a movable carriage adapted to be displaced in a given direction, said device comprising, a lever, a bar secured to one end of said lever to be displaceable in said direction responsive to motion with high mechanical advantage of said lever about a pivot point, said bar having formed therein at its juncture with said lever a reduced cross section portion highly stiff to deformation in said direction but deformable normal thereto to permit incremental relative angular movement between said lever and said bar, a support adapted to be secured to a stationary part of the machine, and affixed to said lever at said pivot point, said support having formed therein between said part and said point a reduced cross section portion highly stiff to deformation in said direction but deformable normal thereto under a moment of said lever about said bar, an electromagnet means interposed between said carriage and said bar to of itself provide therebetween a rigid mechanical link through said electromagnet means upon magnetizing thereof, said link locking said carriage to said bar, a stop block on said support and a stop block on said lever engageable with said support stop block to determine the amount of displacement of said carriage.

2. A device according to claim 1 in which the stop block on the support permits displacement of the lever between two fixed positions.

3. A device according to claim 1 in which the lever is displaced by means of an eccentric and in which a switch means is operated by the rotation of said eccentric to supply current to said electromagnet means for a period extending from before to after the lever displacement by said eccentric.

4. A device according to claim 1 in which the stop block on the support permits displacement of the lever between two positions and current is supplied to the magnetic means before the lever is displaced.

5. A device according to claim 1 in which the lever is displaced by means of an eccentric, a resilient means is mounted on the lever in contact with the eccentric, and the eccentric in rotation operates a switch means to supply current to said electromagnet means for a period extending from before to after said lever displacement.

6. A precision carriage displacement device adapted for use on a machine having a movable carriage adapted to be displaced in a given direction, said device comprising, a lever, a bar secured to said lever to be displaceable in said direction responsive to motion with high lever ratio of said lever about a pivot point, said bar having formed therein at the juncture with said lever a reduced cross section portion highly stiff to deformation in said direction but deformable normal thereto to permit incremental relative angular movement between said lever and said bar, a support adapted to be secured to a stationary part of the machine and affixed to said lever at said pivot point, said support having formed therein between said part and said point a reduced cross section portion highly stiff to deformation in said direction but deformable normal thereto under a moment of said lever about said bar, electromagnet means interposed between said carriage and said bar to of itself provide therebetween a rigid mechanical link through said electromagnet means upon magnetizing thereof, said link locking said carriage to said bar, a stop block means on the support permitting displacement of the lever between two positions to thereby determine the displacement of said carriage, and means for displacing said lever between said two positions.

7. A displacement device comprising, a first member adapted to be displaced in a direction by relative travel thereof with a stationary base, a second similarly displaceable member having formed therein a resilient hinge section constructed to maintain a constant spacing in said direction between end portions of said section under compressive stress applied to said section in said direction, a lever joined with said second member proximate said hinge section to displace said second member substantially entirely in said direction upon motion of said lever about a pivot, lever pivot means adapted to resiliently hinge said lever with said base, said lever pivot means being constructed to maintain a constant spacing in said direction between said lever and said base under compressive stress applied to said pivot means in said direction, coupling means secured to one of said two members and cooperative upon actuation with the other to provide a displacement linkage between said two members, means for imparting said motion to said lever, and means for actuating said coupling means for a period extending from before to after the interval during which said lever undergoes said motion.

8. Displacement apparatus comprising a first member, means mounting said first member to travel in a predetermined path, a second member supported to be separated from said first member by a gap normal to said path and to be displaceable forward and backward in a direction paralleling the direction of travel which, as measured at said gap, characterizes said first member over an incremental displacement thereof in said path, a smooth gripping face extending over one of said members, an electromagnet including a yoke with a gripping face shaped to match at least a portion of said first-named gripping face over a continuous range of relative positions between said gripping faces as said first member travels in said path, said electromagnet being secured to the other member so that said gripping faces are in face-to-face relation, a lever pivoted to be rockable in the displacement direction of said second member and coupled therewith first and second stops spaced apart a preselected distance and each adapted to engage with said lever to respectively define backward and forward travel limits therefor as said lever is rocked, drive means coupled with said lever to periodically rock the same from engagement with said first stop to engagement with said second stop and then back to engagement with said first stop, said forward and backward rockings producing forward and backward displacements of said second member, a lost motion device interposed between said drive means and lever to permit overshoot in the displacement direction of the former with respect to the latter after said lever has engaged said second stop, and means operable in timed relation with said drive means to energize said electromagnet for a period extending from before to after said forward displacement takes place, and terminating before said backward displacement takes place, said electromagnet when energized locking said gripping faces together by magnetic force to link said members together rigidly with respect to a forward displacement of said second member.

9. Displacement apparatus comprising a first member, means mounting said first member to travel in a predetermined path, a second member supported to be separated from said first member by a gap normal to said path and to be displaceable forward and backward in a direction paralleling the direction of travel which, as measured at said gap, characterizes said first member over an incremental displacement thereof in said path, a smooth gripping face extending over one of said members, an electromagnet including a yoke with a gripping face shaped to match at least a portion of said first-named gripping face over a continuous range of relative positions between said gripping faces as said first member travels in said path, said electromagnet being secured to the other member so that said gripping faces are in face-to-face relation, a lever pivoted to be rockable in the displacement direction of said second member, said lever being joined to said second member to form therewith a unitary angled frame which structurally is self-sustaining as to the relative positions of its second member and lever components, said second member having proximate the juncture thereof with said lever a weakened portion, which maintains constant under compressive stress applied to said weakened portion in the displacement direction the spacings in said displacement direction between the portions of said lever and second member adjacent said weakened portion, said weakened portion being adapted to permit incremental angular movement between said second member and lever when the latter is rocked, means adapted both to provide the pivot for said lever and to support said frame at the point where said lever is pivoted, drive means periodically operable to rock said lever in a reciprocating manner to produce a forward and backward displacement of said second member, and means operable in timed relation with said drive means to energize said electromagnet for a period extending from before to after said forward displacement takes place, and terminating before said backward displacement takes place said electromagnet when energized locking said gripping faces together by magnetic force to link said members together rigidly with respect to a forward displacement of said second member.

10. Displacement apparatus comprising a first member, means mounting said first member to travel in a predetermined path, a second member supported to be separated from said first member by a gap normal to said path and to be displaceable forward and backward in a direction paralleling the direction of travel which, as measured at said gap, characterizes said first member over an incremental displacement thereof in said path, a smooth gripping face extending over one of said members, an electromagnet including a yoke with a gripping face shaped to match at least a portion of said first-named gripping face over a continuous range of relative positions between said gripping faces as said first member travels in said path, said electromagnet being secured to the other member so that said gripping faces are in face-to-face relation, a lever coupled to said second member and pivoted to be rockable in the displacement direction of said second member, a fulcrum member having a portion secured to said lever and a portion adapted to be secured to a stationary base, said fulcrum member being adapted under compressive stress applied thereto in the displacement direction to maintain constant the spacing in said displacement direction between said lever and base, said fulcrum member being adapted under torque to act as a pivot for said lever when said fulcrum member is secured to said base, drive means periodically operable to rock said lever in a reciprocating manner to produce a forward and backward displacement of said second member, and means operable in timed relation with said drive means to energize said electromagnet for a period extending from before to after said forward displacement takes place and terminating before said backward displacement takes place, said electromagnet when energized locking said gripping faces together by magnetic force to link said members together rigidly with respect to a forward displacement of said second member.

11. Displacement apparatus comprising a first member, means mounting said first member to travel in a predetermined path, a second member supported to be separated from said first member by a gap normal to said path and to be displaceable forward and backward in a direction paralleling the direction of travel which, as measured at said gap, characterizes said first member over an incremental displacement thereof in said path, a smooth gripping face extending over one of said members, an electromagnet including a yoke with a gripping face shaped to match at least a portion of said first-named gripping face over a continuous range of relative positions between said gripping faces as said first member travels in said path, said electromagnet being secured to the other member so that said gripping faces are in face-to-face relation, a lever pivoted to be rockable in the displacement direction of said second member, said lever being joined to said second member to form therewith a unitary angled frame which is structurally self-sustaining as to the relative positions of its second member and lever components, said second member proximate the juncture thereof with said lever having a weakened portion which maintains constant under compressive stress applied to said weakened portion in the displacement direction the spacing in said displacement direction between the portions of said lever and second member adjacent said weakened portion, said weakened portion being adapted to permit incremental angular movement between said second member and lever when the latter is rocked, a fulcrum member having one portion secured to said lever and another portion adapted to be secured to a stationary base to thereby support said frame, said fulcrum member being adapted under compressive stress applied thereto in the displacement direction to maintain constant the spacing between said lever and base, said fulcrum member being adapted under torque to act as a pivot for said lever when said fulcrum member is secured to said base, drive means periodically operable to rock said lever in a reciprocating manner to produce a forward and backward displacement of said second member, and means operable in timed relation with said drive means to energize said electromagnet for a period extending from before to after said forward displacement takes place and terminating before said backward displacement takes place, said electromagnet when energized locking said gripping faces together by magnetic force to link said members together rigidly with respect to a forward displacement of said member.

12. Displacement apparatus comprising a first member, means mounting said first member to travel in a predetermined path, a second member supported to be separated from said first member by a gap normal to said path and to be displaceable forward and backward in a direction paralleling the direction of travel which, as measured at said gap, characterizes said first member over an increment displacement thereof in said path, a smooth gripping face extending over one of said members, an electromagnet including a yoke with a gripping face shaped to match at least a portion of said first-named gripping face over a continuous range of relative positions between said gripping faces as said first member travels in said path, said electromagnet being secured to the other member so that said gripping faces are in face-to-face relation, a lever pivoted to be rockable in the displacement direction of said second member, said lever being joined to said second member to form therewith a unitary angled frame which is structurally self-sustaining as to the relative positions of its second member and lever components, said second member proximate the juncture thereof with said lever a weakened portion which maintains constant under compressive stress applied to said weakened portion in the displacement direction the spacing in said displacement direction between the portions of said lever and second member adjacent said weakened portion, said weakened portion being adapted to permit incremental angular movement between said second member and lever when the latter is rocked, a fulcrum member having one portion secured to said lever and another portion adapted to be secured to a stationary base to thereby support said frame, said fulcrum member being adapted under compressive stress applied thereto in the displacement direction to maintain constant the spacing between said lever and base, said fulcrum member being adapted under torque to act as a pivot for said lever when said fulcrum member is secured to said base, first and second stops spaced apart a preselected distance and each adapted to engage with said lever to respectively define backward and forward travel limits therefor as said lever is rocked, drive means coupled with said lever to periodically rock the same from engagement with said first stop to engagement with said second stop and then back to engagement with said first stop, said forward and backward rockings producing forward and backward displacements of said second member, a lost motion device interposed between said drive means and lever to permit overshoot in the displacement direction of the former with respect of the latter after said lever has engaged said second stop, and means operable in timed relation with said drive means to energize said electromagnet for a period extending from before to after said forward displacement takes place and terminating before said backward displacement takes place, said electromagnet when energized locking said gripping faces together by magnetic force to link said members together rigidly with respect to a forward displacement of said second member.

13. Displacement apparatus comprising a first member, means mounting said first member to travel in a predetermined path, a second member supported to be separated from said first member by a gap normal to said path and to be displaceable forward and backward in a direction paralleling the direction of travel which, as measured at said gap, characterizes said first member over an incremental displacement thereof in said path, a smooth gripping face extending over one of said members, coupling means secured to the other of said members and having a gripping face which is shaped to match at least a portion of said first-named gripping face over a continuous range of relative positions between said gripping faces as said first member travels in said path, the gripping face of said coupling means being disposed in face-to-face relation with the gripping face of said one member, a lever coupled to said second member and pivoted to be rockable in a reciprocating manner in the displacement direction of said second member, first and second stops spaced apart a preselected distance and each adapted to engage with said lever to respectively define backward and forward travel limits therefor as said lever is rocked, drive means coupled with said lever to periodically rock the same from engagement with said first stop to engagement with said second stop and then back to engagement with said first stop, said forward and backward rockings producing forward and backward displacements of said second member, a lost motion device interposed between said drive means and lever to permit overshoot in said displacement direction of the former with respect of the latter after said lever has engaged said second stop, and means operable in timed relation with said drive means to actuate said coupling means for a period extending from before to after said forward displacement takes place, and terminating before said backward displacement takes place, said coupling means when actuated locking said gripping faces together to link said members together rigidly with respect to a forward displacement of said second member.

References Cited in the file of this patent

UNITED STATES PATENTS

| 646,287 | Hundhausen | Mar. 27, 1900 |
| 1,606,929 | Fernandes | Nov. 16, 1926 |
| 1,635,068 | Bing | July 5, 1927 |
| 2,129,847 | Knodel | Sept. 13, 1938 |
| 2,270,117 | Fill | Jan. 13, 1942 |
| 2,644,427 | Sedgefield et al. | July 7, 1953 |

FOREIGN PATENTS

| 11,724 1915 | Great Britain | July 6, 1916 |
| 450,582 | Germany | Oct. 10, 1927 |